United States Patent [19]
Moriyama et al.

[11] Patent Number: 5,572,333
[45] Date of Patent: Nov. 5, 1996

[54] COMPRESSED DATA RECORDING METHOD USING INTEGRAL LOGICAL BLOCK SIZE AND PHYSICAL BLOCK SIZE RATIOS

[75] Inventors: Yoshiaki Moriyama; Kouichi Ono, both of Tsurugashima; Sumio Hosaka; Takao Yamada, both of Tokorozawa, all of Japan

[73] Assignee: Pioneer Electronic Corporation, Tokyo, Japan

[21] Appl. No.: 614,940

[22] Filed: Mar. 11, 1996

Related U.S. Application Data

[63] Continuation of Ser. No. 262,501, Jun. 20, 1994, abandoned.

[30] Foreign Application Priority Data

Jul. 16, 1993 [JP] Japan ..................... 5-176694

[51] Int. Cl.$^6$ ............... H04N 5/76; H04N 5/91; G11B 5/00; G11B 5/09
[52] U.S. Cl. ................. 386/98; 360/32; 360/48; 386/104; 386/112; 386/127
[58] Field of Search ...................... 358/335, 310, 358/341, 342, 343, 322; 360/32, 48, 39, 9.1; 369/48; H04N 5/76, 5/91, 5/92, 9/79

[56] References Cited

U.S. PATENT DOCUMENTS 5,097,261 3/1992 Langdon, Jr. et al. .......... 341/51

5,113,512 5/1992 Miki et al. ............... 395/425
5,386,402 1/1995 Iwata ..................... 369/32

*Primary Examiner*—Thai Q. Tran
*Attorney, Agent, or Firm*—Sughrue, Mion, Zinn, Macpeak & Seas

[57] ABSTRACT

A method of recording compressed and coded data is designed to improve the speed and ease of random accessing, and to reduce the buffer capacity and facilitate control and editing in the reproducing system. The method comprises the steps of compressing and coding video signals for every predetermined number of frames with the amount of codes per predetermined number of frames being constant; storing the predetermined number of frames of compressed and coded video signals into at least one video packet; storing the video packet in a pack having a time slot corresponding to the predetermined number of frames (preferably at the end of the pack); and recording the video signals on the recording medium in a pack stream containing such packs, with the relation between the size of the pack and the size of the logical block of the recording medium being set to 1:n (n: an integer) and the relation between the size of the pack and the size of the physical block of the recording medium being set to 2:m (m: an integer).

8 Claims, 7 Drawing Sheets

COMPRESSED DATA RECORDING METHOD USING INTEGRAL LOGICAL BLOCK SIZE AND PHYSICAL BLOCK SIZE RATIOS

This is a continuation of application Ser. No. 08/262,501, filed Jun. 20, 1994 now abandoned.

BACKGROUND OF THE INVENTION

1. Field of the Invention

The present invention relates to a method of recording compressed and coded video signals on a recording medium, and a method of recording compressed and coded video signals, audio signals and other data in time-division multiplexing.

2. Description of Background Information

As a method of recording, reproducing or transferring compressed and coded video and audio signals and other data in time-division multiplexing, there is MPEG (Motion Picture coding Experts Group) which conform to ISO 11172.

The compressive coding of video signals in this scheme employs predictive coding in combination with motion compensation, and discrete cosine transform (DCT).

In this conventional method or in a system which records and reproduces a multiplexed signal consisting of compressed and coded video and audio signals and various kinds of data (audio/video/data multiplexed stream) on and from a predetermined recording medium, the speed and ease of random accessing, and the reduction of the buffer capacity and the facilitation of control and editing in the reproducing system are not sufficiently accomplished.

SUMMARY OF THE INVENTION

It is therefore an object of the present invention to provide a method of recording compressed and coded data, which is advantageous in improving the speed and ease of random accessing, and reducing the buffer capacity and facilitating control and editing in the reproducing system.

To achieve the above object, according to this invention, there is provided a compressed and coded data recording method for recording video signals on a recording medium in compressed and coded form, which method comprises the steps of compressing and coding video signals for every predetermined number of frames with an amount of codes per the predetermined number of frames being constant; storing the predetermined number of frames of compressed and coded video signals into at least one video packet; storing the video packet in a pack having a time slot corresponding to the predetermined number of frames; and recording the video signals on the recording medium in a pack stream containing such packs, with a relation between a size of the pack and a size of a logical block of the recording medium being set to 1:n (n is an integer) and a relation between the size of the pack and a size of a physical block of the recording medium being set to 2:m (m is an integer).

According to this method, the correlations between a predetermined number of frames of video signals to be recorded and the sizes of the logical block and physical block of the recording medium are well organized.

The compressed and coded data recording method of the present invention has another characteristic such that the video packet is stored at the end of a pack. Therefore, the data packet and audio packet which contain small amounts of data have only to be delayed to be synchronous with the timing of reproducing the video packet, so that a buffer memory required for accomplishing this delay can have a small capacity.

DETAILED DESCRIPTION OF THE PREFERRED EMBODIMENT

Before discussing a preferred embodiment of the present invention, the conventional compressive coding method will be described referring to the accompanying drawings.

An image coded by the MPEG scheme consists of an I picture (Intra coded picture) coded within a frame, a P picture (predictive coded picture) obtained by coding the difference between the current image and an old picture (decoded image of an I or P picture) and a B picture (Bidirectionally predictive coded picture) obtained by coding the difference between the current image and an interpolated image which is predicted bidirectionally from old and future images. The predictive directions are illustrated in FIG. 1.

Figure 1:
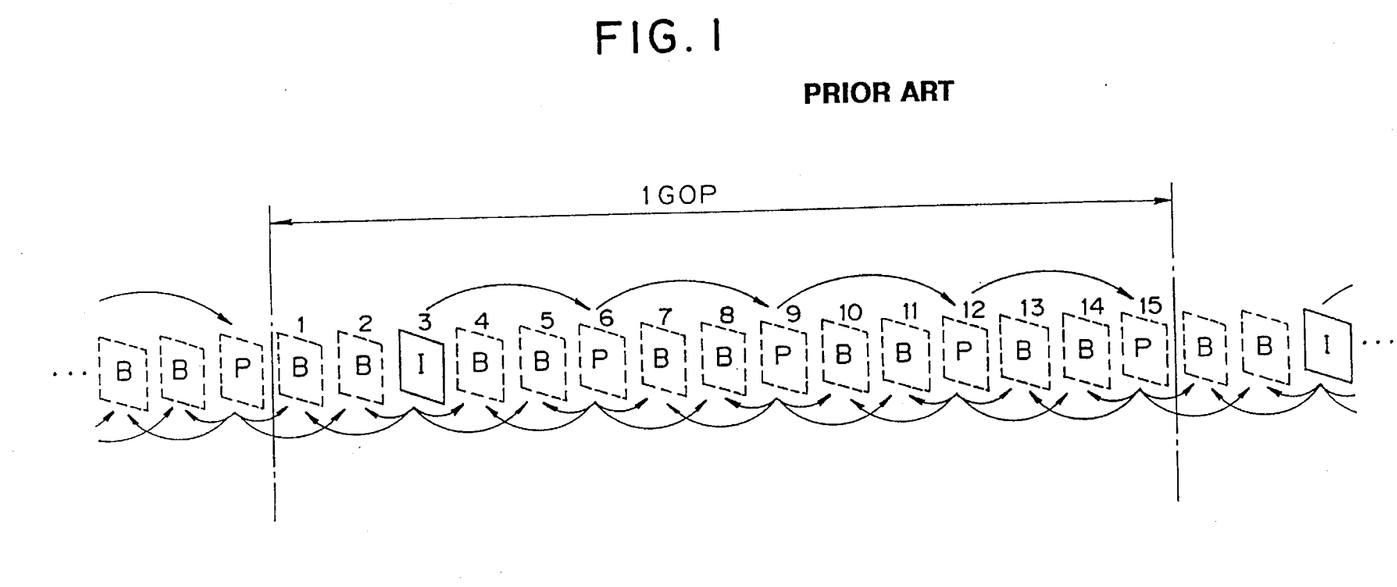
FIG. 1 is a diagram showing the directions of prediction between frames of video signals in the compressive coding which conforms to ISO 11172.

Referring to FIG. 1, coded frame images are symbolized as parallelograms frame by frame. Those frame images correspond to consecutive frames of input video signals, and "I", "P" and "B" affixed to the frame images indicate the aforementioned types of pictures of the frame images. The arrowheads indicate the directions of prediction between frames.

A certain video sequence unit is collectively called "GOP" (Group Of Pictures). As one example, 15 frames are treated as this unit in FIG. 1 and are sequentially given frame numbers.

The compression efficiency in this coding varies with the difference in the coding scheme of the individual picture types. The compression efficiency is the highest for B pictures, the next highest compression efficiency for P pictures and the lowest compression efficiency for I pictures. The amounts of each frame and each GOP are not constant and differ depending on video information to be transmitted.

Figure 2:
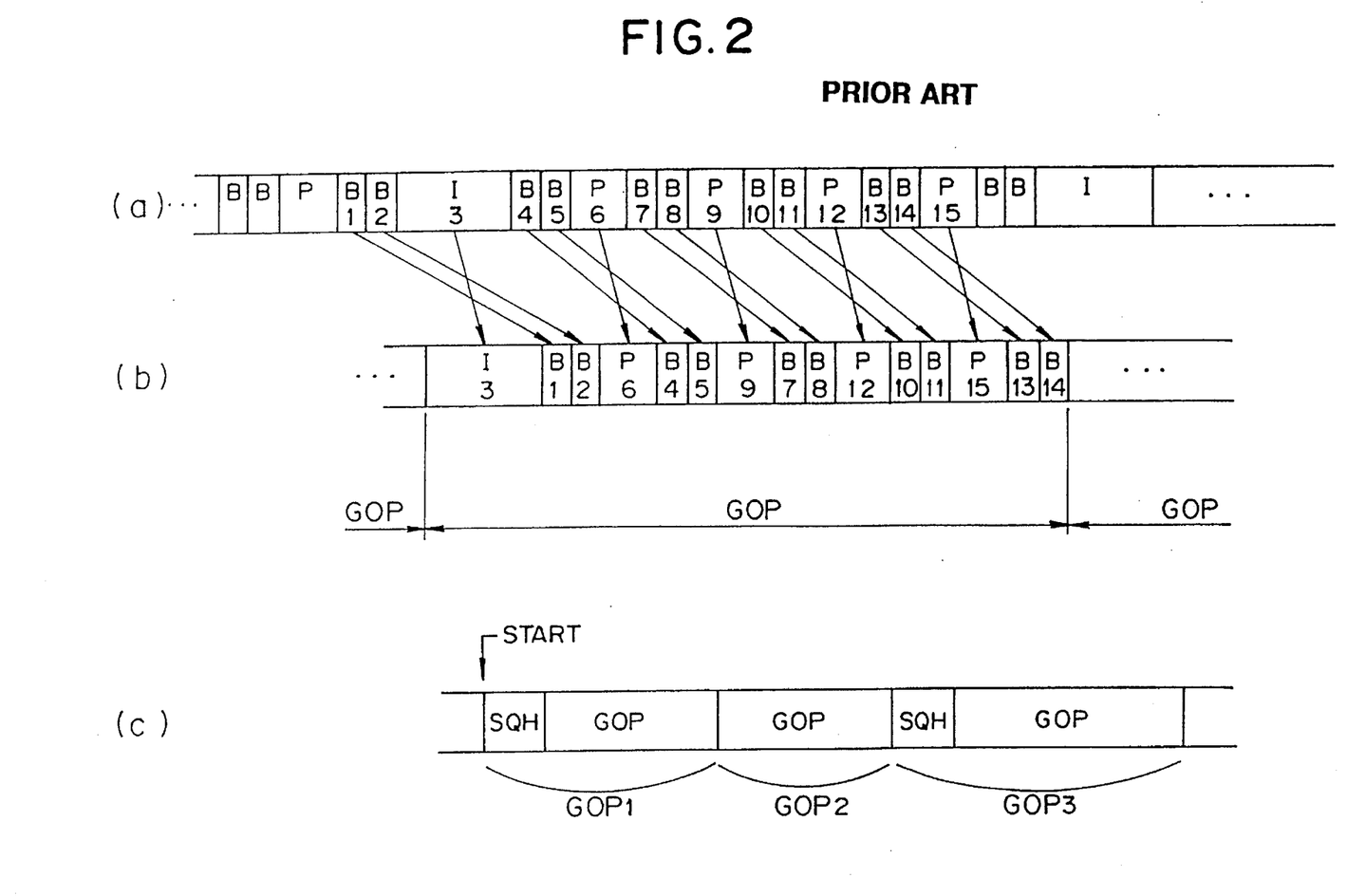
FIG. 2 is a diagram showing the transmission state of a video stream which conforms to ISO 11172.

While the order of uncompressed frames are as shown in FIG. 1, the order of compressed frames at the time of transmission becomes as shown in FIG. 2 for the purpose of reducing the delay time in the decoding process.

Portions (a) and (b) in FIG. 2 conceptually illustrate each coded frame image in view of the amount of data after compression, and the picture types I, P and B and frame numbers correspond to those shown in FIG. 1. The coded video signals are arranged in the order of frame numbers as illustrated, and a sequence header SQH can be affixed to ensure independent reproduction GOP by GOP as shown in a portion (c) in FIG. 2. The sequence header, which is located at least at the head of a stream of data or a video stream as shown in the portion (b) in FIG. 2, describes information about the entire video stream. The sequence header may be affixed to the head of every GOP to ensure reproduction of data from a middle part of each GOP, and includes initial data needed for the decoding process, such as the size of an image and the ratio of the vertical pixels to the horizontal pixels. A video stream to be transferred to a decoder is formed in the above manner.

The system part of the MPEG further specifies a scheme of multiplexing a compressed audio stream and a stream of other data in addition to the aforementioned compressed video stream and accomplishing the synchronized reproduction of those streams.

Figure 3:
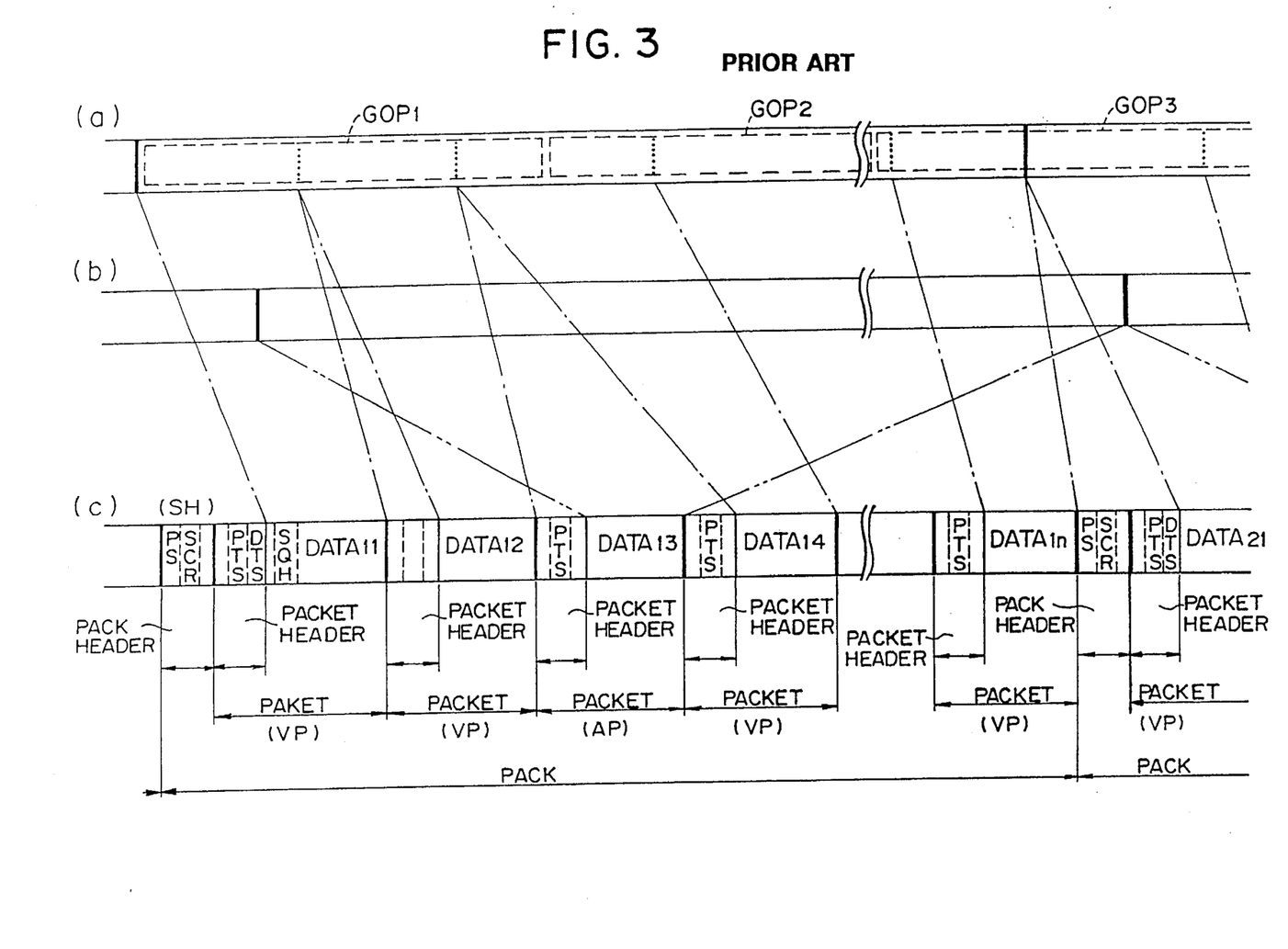
FIG. 3 is a diagram exemplifying the multiplexing of various kinds of data that is specified by the system part of MPEG which conforms to ISO 11172.

FIG. 3 exemplifies the multiplexing of various kinds of data, which is specified by the system part of the MPEG.

In FIG. 3, a portion (a) indicates a data stream of coded video signals consecutively arranged in the order of GOPs as indicated by the portion (c) in FIG. 2, i.e., a video stream, and a portion (b) indicates a data stream of audio signals that are compressed and coded by a predetermined coding scheme which will not be discussed in detail. Partial data of each stream is stored in a packet together with a packet header located at the head of the packet. A packet in which video stream data is stored is called a video packet (VP), and a packet in which audio stream data is stored is called an audio packet (AP). Likewise, a packet in which a stream of data other than video and audio signals, such as control data, is stored is called a data packet (DP) though not illustrated.

Some of those packets are grouped as a pack with a pack header placed at the head of this pack. The packets are transmitted pack by pack in the form shown in a portion (c) in FIG. 3. In the packet transmission, the pack header serves as a system header (SH) which describes information about the whole pack stream and includes a pack start code PS and a system clock reference SCR that indicates the reference of time. The packet header includes a presentation time stamp PTS and a decoding time stamp DTS as needed. A pack is the collection of individual partial streams each corresponding to a packet.

SCR in the pack header is the number of system clocks of 90 KHz counted from some point of time, and is used as a reference of time in reproducing the associated pack. PTS in the packet header represents the time at which the presentation of the packet containing that PTS as a video image or sound and voices starts, by the number of the system clocks counted. DTS represents the time at which decoding of the packet containing that DTS starts. For B pictures in a video packet and an audio packet, the time data of PTS equals that of DTS so that DTS need not particularly be described. For I and P pictures in a video packet, since the presentation starting time lags from the decoding starting time due to the rearrangement of the frames in the opposite order to the one shown in FIG. 2, PTS and DTS should be inserted as needed. PTS or a combination of PTS and DTS is inserted in a stream of video and audio packets at an interval of 0.7 sec or below.

In reproducing such a stream of packs, the value of SCR is loaded into a counter in a reproducing apparatus and thereafter the counter starts counting the system clock and is used as a clock. When PTS or DTS is present, each packet is decoded at the timing at which the presentation of the packet as a video image or sound and voices starts when the value of the counter coincides with PTS. With no PTS and DTS present, each packet is decoded following the decoding of the previous packet of the same kind.

Figure 4:
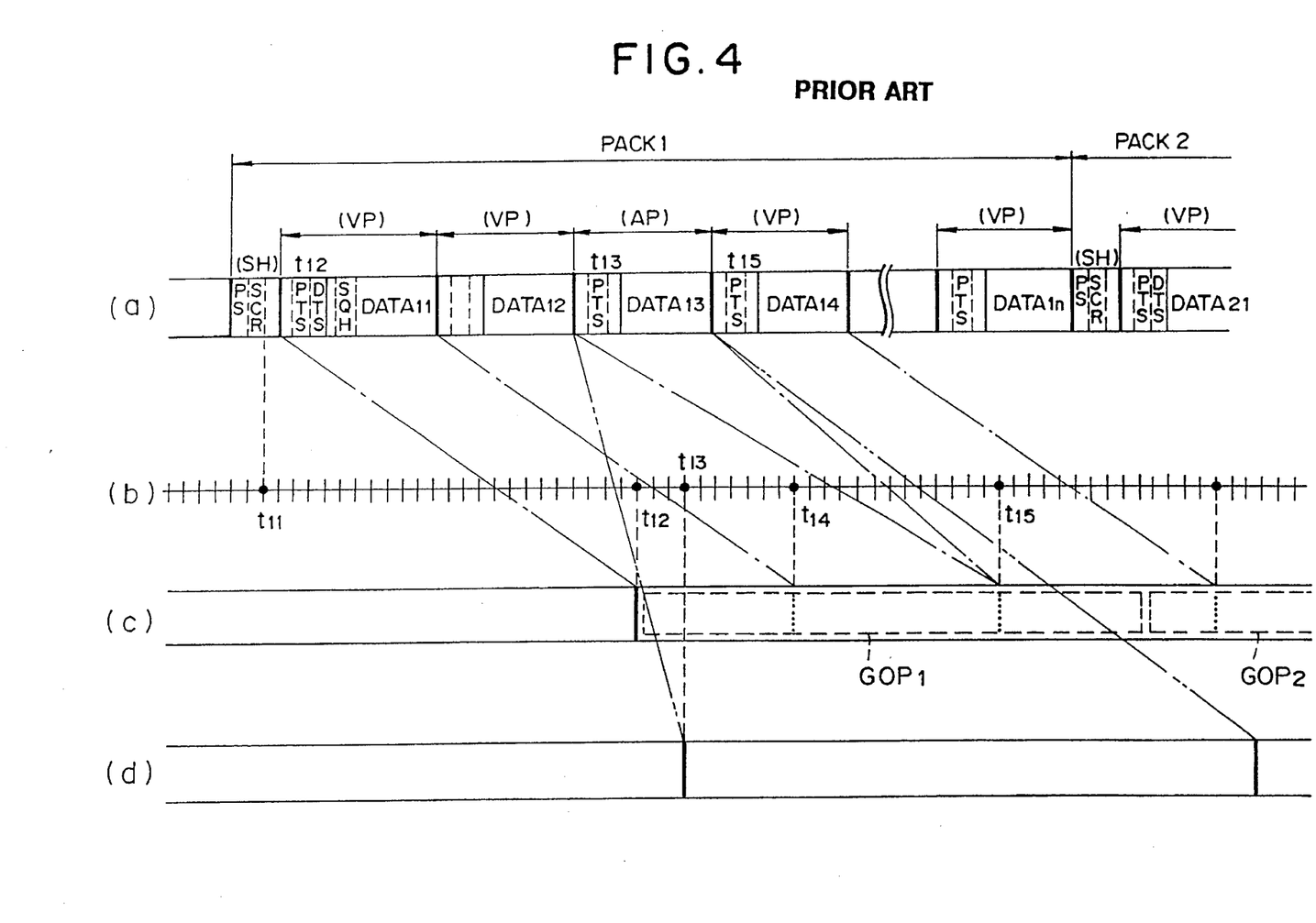
FIG. 4 is a diagram for explaining various time stamps and reference time information, showing how a stream of multiplexed packs in FIG. 3 is reproduced.

The above will be conceptually explained below. Suppose that SCR of a pack 1 has been input at time t11 based on the system clock indicated in a portion (b) in FIG. 4 which illustrates the reproduction state of the stream of packs that are denoted by the same shapes and reference numerals as used in FIG. 3. Time data t11 is described in the SCR. As video stream data whose presentation starts from time t12 is stored in data DATA11 in the first packet in the pack 1, time data t12 is described in PTS of that packet. As audio stream data whose presentation starts from time t13 is stored in data DATA13 in the third packet in the pack 1, time data t13 is described in PTS of that packet. As the end portion of GOP1 whose presentation starts from time t15 and the head portion of subsequent GOP2 are stored in data DATA14 in the fourth packet in the pack 1, time data t15 is described in PTS of that packet. For the subsequent packets, SCR and PTS are described in the same manner. A portion (c) in FIG. 4 shows presented video signals and a portion (d) presented audio signals. Although no PTS is described in the header of that packet which stores packet data DATA12, such a description is unnecessary as long as PTS is inserted at the aforementioned interval of 0.7 sec or less. Assuming that GOP has the structure shown in FIG. 2, then the packet data DATA11 is stored from the data of the first I picture of the GOP1, so that a value equivalent to the time earlier by three frames than PTS is described in DTS in the packet header of the DATA11.

The main characteristics of the compressive coding of MPEG video signals and the time-division multiplexing of various kinds of data, which conform to ISO 11172, are as follows:

(1) The amount of data in a video stream differs frame by frame and GOP by GOP.

(2) The sequence header SQH, which describes information about the entire video stream, is located at least at the head of the video stream.

(3) The system header SH, which describes information about the whole stream of packs, is placed at least at the head of the pack stream.

(4) Various packets VP, AP and DP may be arranged in a pack in an arbitrary order.

(5) The boundary between GOPs is not associated at all with the boundary between packs, and the relations of the pack boundary with the boundary between logical blocks and of the boundary between the physical blocks of a package medium like a disk are not particularly specified.

In view of the above, in a system of recording and reproducing such a pack stream (audio/video/data multiplexed stream) on and from a predetermined recording medium, the speed and ease of random accessing, and the reduction of the buffer capacity and the facilitation of control and editing in the reproducing system are not sufficiently accomplished.

The present invention will now be described in detail referring to the accompanying drawings.

Figure 5:
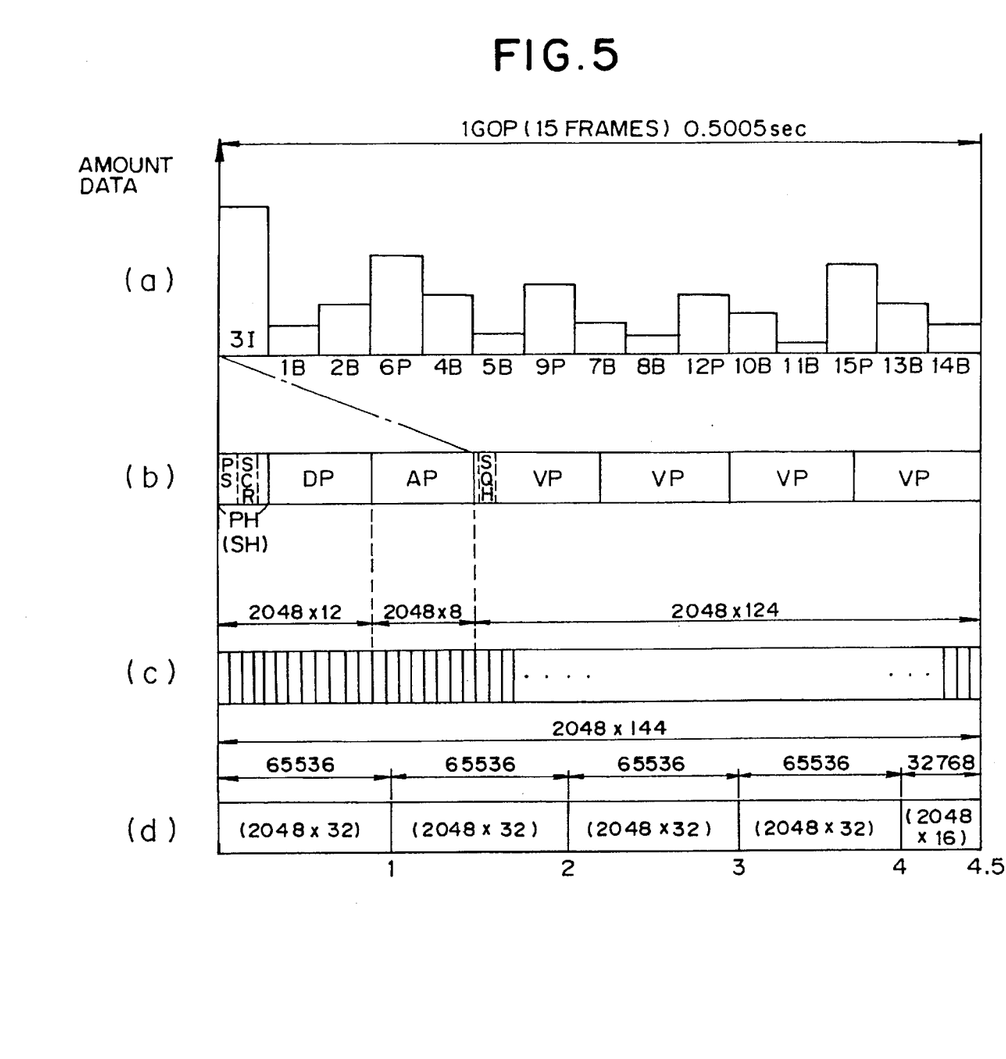
FIG. 5 is a diagram showing a data format in a method of recording compressed and coded data according to one embodiment of the present invention.

FIG. 5 is a diagram showing a data format in a method of recording compressed and coded data according to one embodiment of the present invention.

In FIG. 5, the amount of data of video signals after compression as shown in (b) in FIG. 2 differs frame by frame but should always be constant in one GOP. A scheme for making the amount of data in a single GOP constant will be discussed later. A portion (a) in FIG. 5 shows the amount of data for each frame in a GOP, with the vertical scale representing the amount of data and the horizontal scale representing frames 3I to 14B. The data of the GOP is stored as a video packet VP in a pack together with an audio packet AP and a data packet DP as indicated in a portion (b) in FIG. 5. The size of One logical block (a portion (c) in FIG. 5) of a predetermined recording medium on which such packets are recorded is 2048 bytes, and one pack has a size of 2048×144 bytes (144 logical blocks). In one pack, the system header SH including the pack start code PS and system clock reference SCR, and a data packet DP occupy 2048×12 bytes, an audio packet AP occupies 2048 ×8 bytes and four video packets VP occupy 2048×124 bytes.

The upper limit of the bit rate for audio and video signals after compression become as follows.

audio: 2048×8×8/0.5005=261.88 (Kbps)

video: 2048×124×8/0.5005=4.059 (Mbps)

The above bit rates are sufficient to transmit two channels of high-quality audio signals and video signals having a high image quality. To provide four channels of audio signals, the size of the data packet DP should be changed to 2048×4 bytes and an audio packet of 2048×8 bytes should be added so that each pack contains two systems of audio signals.

The number of physical blocks (portion (d) in FIG. 5) of the predetermined recording medium varies depending on the error correcting system, particularly, the property of a burst error and the size of redundancy allowed by the error correction code in the recording and reproducing system for the recording medium. For instance, when one physical block has a size of $2^{16}$=65536 bytes, one pack has four and half physical blocks, and when one physical block has a size of $2^{15}$=32768 bytes, one pack has nine physical blocks.

The ratio of a pack to physical blocks is set to 2:9 in this embodiment for the following reason. The period of a GOP accessible at random is the period of one pack, the size of the pack is set to 2048×144 bytes to ensure transmission of two or four channels of high-quality audio signals and high-quality video signals, and the size of the physical block is set to $2^{16}$ bytes to increase the interleave length while reducing the redundancy of the error correction code.

As the audio packet AP contains compressed audio signals which should be reproduced at substantially the same time as the GOP, decoding the audio signals and reproducing them in synchronism with the video signals require a buffer memory which has a capacity to store at least one packet of audio signals plus audio signals for the decoding delay of video signals. Because the audio signals carry a small amount of data, however, the buffer memory can have a small capacity. The same is true of the data packet DP. To reduce the capacities of delaying buffers to accomplish synchronous reproduction, those two types of packets having small amounts of data are arranged in front of video packets.

Random accessing of GOPs recorded on a recording medium is accomplished by accessing a target physical block in accordance with the address, which is finally assigned to that physical block and is acquired by searching the logical blocks. Since the correlation between the logical blocks and the physical block for any GOP in FIG. 5 is simple, fast random access can be accomplished easily. GOP data whose quantity is constant is divided into four packets which are stored in a pack having a time slot corresponding to this GOP and the size of the pack has simple integer ratios to the sizes of the logical block and physical block of the recording medium. In this case, the pack and the logical block have a relation of 1:144 and the pack and the physical block have a relation of 2:9. In the recording and reproducing system for the recording medium, therefore, positional control should be performed on the information detected point based on the simple relations of one GOP per 144 logical blocks and nine physical blocks per pack, at the time the desired GOP is accessed. The accessing process is therefore performed quickly and simply. With regard to the relation between the packet and logical blocks, the ratio of the size of the pack header and a data packet to the size of logical blocks is 1:12, the ratio of the size of an audio packet and the size of the logical blocks is 1:8, the ratio of the size of the total video packets and the size of the logical blocks is 1:124. With regard to the relation between the packet and physical blocks, the ratio of the size of the pack header and a data packet to the size of physical blocks is 3:8, the ratio of the size of an audio packet and the size of the physical blocks is 1:4, the ratio of the size of the total video packets and the size of the physical blocks is 31:8. Those correlations are more desirable if they are simpler.

As the system header SH and sequence header SQH are inserted in every pack, reproduction can easily start from an arbitrary GOP.

Because the individual GOPs are not fully independent from one another as shown in FIG. 1, when reproduction starts from an arbitrary GOP, the first two B picture frames of the first GOP cannot be decoded. If a GOP to be accessed at random is determined previously, the first two B picture frames can become decodable if they are coded without using prediction from the previous P picture frame.

The same can apply to the editing of data GOP by GOP, so that if the editing point is known previously, the editing can be performed in the same manner as the random accessing.

While reproduction can start from any GOP, an end code indicating the end of reproduction should be generated inside the reproducing apparatus as needed in order to end the reproduction at an arbitrary GOP.

If the audio signals and video signals are associated with music, a stream of packs consists of several pieces of music and random access of the pack stream music by music is sufficient, the aforementioned system header SH and sequence header SQH should be inserted only at the head of each piece of music.

Further, the contents of those headers, once loaded, may not necessarily be read every random accessing, depending on the structure of the decoder. Even in this case, those headers need not be inserted in every pack.

A description will now be given of a method for making the amount of data of a video stream in one GOP constant.

Figure 6:
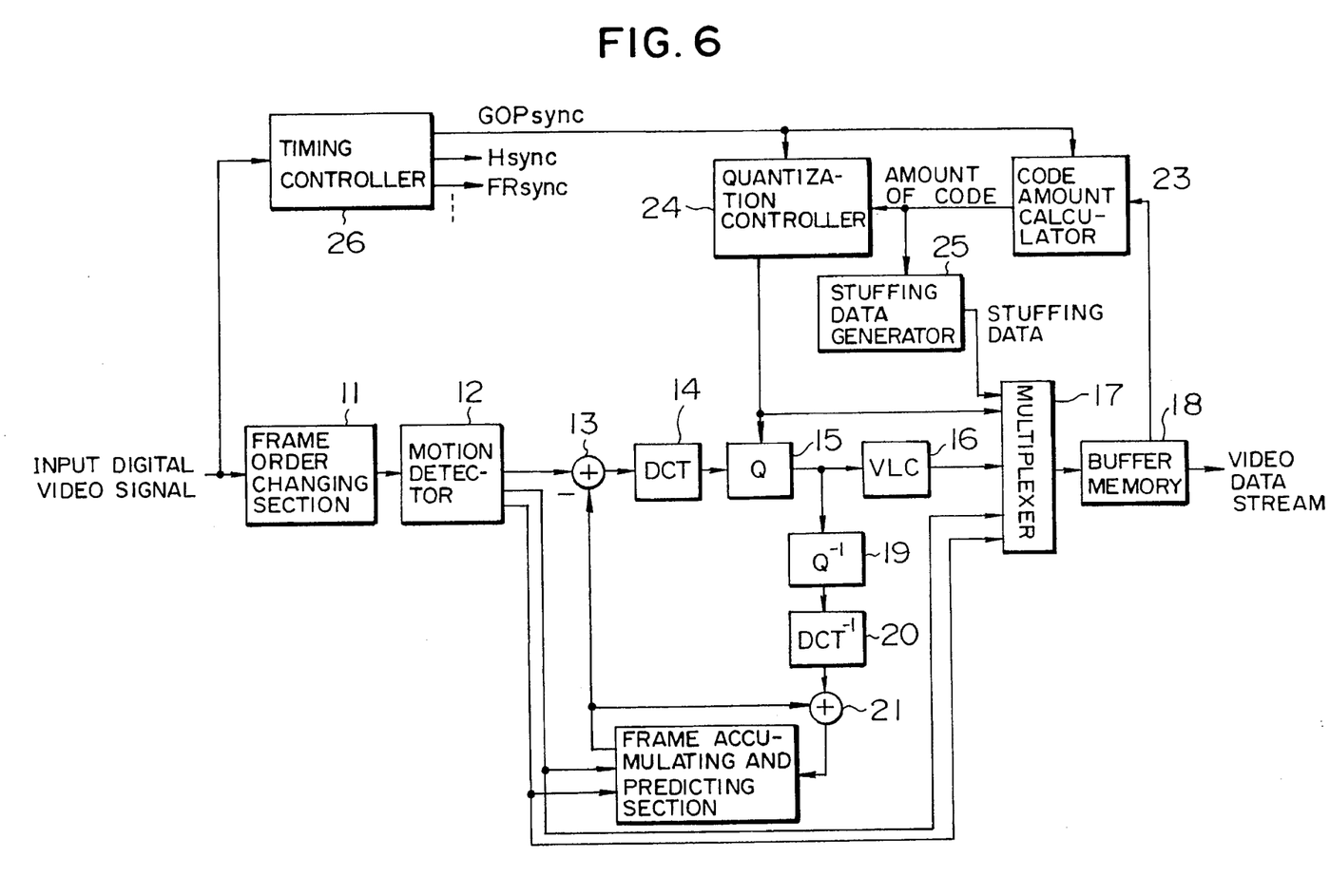
FIG. 6 is a schematic block diagram of an encoder which accomplishes a method of making the amount of data of GOP (Group Of Pictures) constant in the present invention.

FIG. 6 presents a schematic block diagram of an encoder which accomplishes this method.

In FIG. 6, the encoder comprises a frame order changing section 11, a motion detector 12, a differentiator 13, a discrete cosine transformer (DCT) 14, a quantizer 15, a variable length coder (VLC) 16, a multiplexer 17, a buffer memory 18, an inverse quantizer 19, an inverse DCT 20, an adder 21 and a frame accumulating and predicting section 22. The predicting section 22 detects the moving vector, and determines the prediction mode. The inverse DCT 20, inverse quantizer 19 and adder 21 constitute a local decoder.

The basic function of this encoder is to perform discrete cosine transform (DCT) of an input digital video signal by the DCT 14, quantize the transformed coefficient by the quantizer 15, encode the quantized value by the VLC 16 and output the coded data as a video stream via the buffer memory 18. The DCT, quantization and coding are carried out in accordance with the detection of the moving vector, the discrimination of the prediction mode, etc., which are accomplished by the local decoder, the predicting section 22 and the motion detector 12.

While the basic structure and function of this encoder are described in the specifications of the aforementioned ISO 11172, the block which makes the amount of data in one GOP in the output video stream will be discussed in the following description.

This block comprises a code amount calculator 23, a quantization controller 24, a stuffing data generator 25, and a timing controller 26. The code amount calculator 23 attains the amount of stored data occupying the buffer memory 18 and calculates the amount of accumulated data of video signals, coded at the input section of the buffer memory 18, (amount of codes) from the head of the GOP. The quantization controller 24 determines the quantizer scale for each predetermined unit obtained by dividing one frame by a predetermined size in accordance with the amount of the stored data and the amount of accumulated data, and controls the amount of coded data. The stuffing data generator 25 generates predetermined stuffing data in accordance with the amount of accumulated data. The timing controller 26 generates timing signals necessary for the individual sections, such as a horizontal sync signal Hsync, a frame sync signal FRsync and a GOP sync signal GOPsync, based on the input digital video signal. The quantizer 15 quantizes the coefficient after DCT, divides this value by the quantizer scale obtained by the quantization controller 24, and then outputs the resultant value. The quantizer scale becomes an input to the multiplexer 17. The output of the stuffing data generator 25, which will be discussed later, is also one input to the multiplexer 17.

Figure 7:
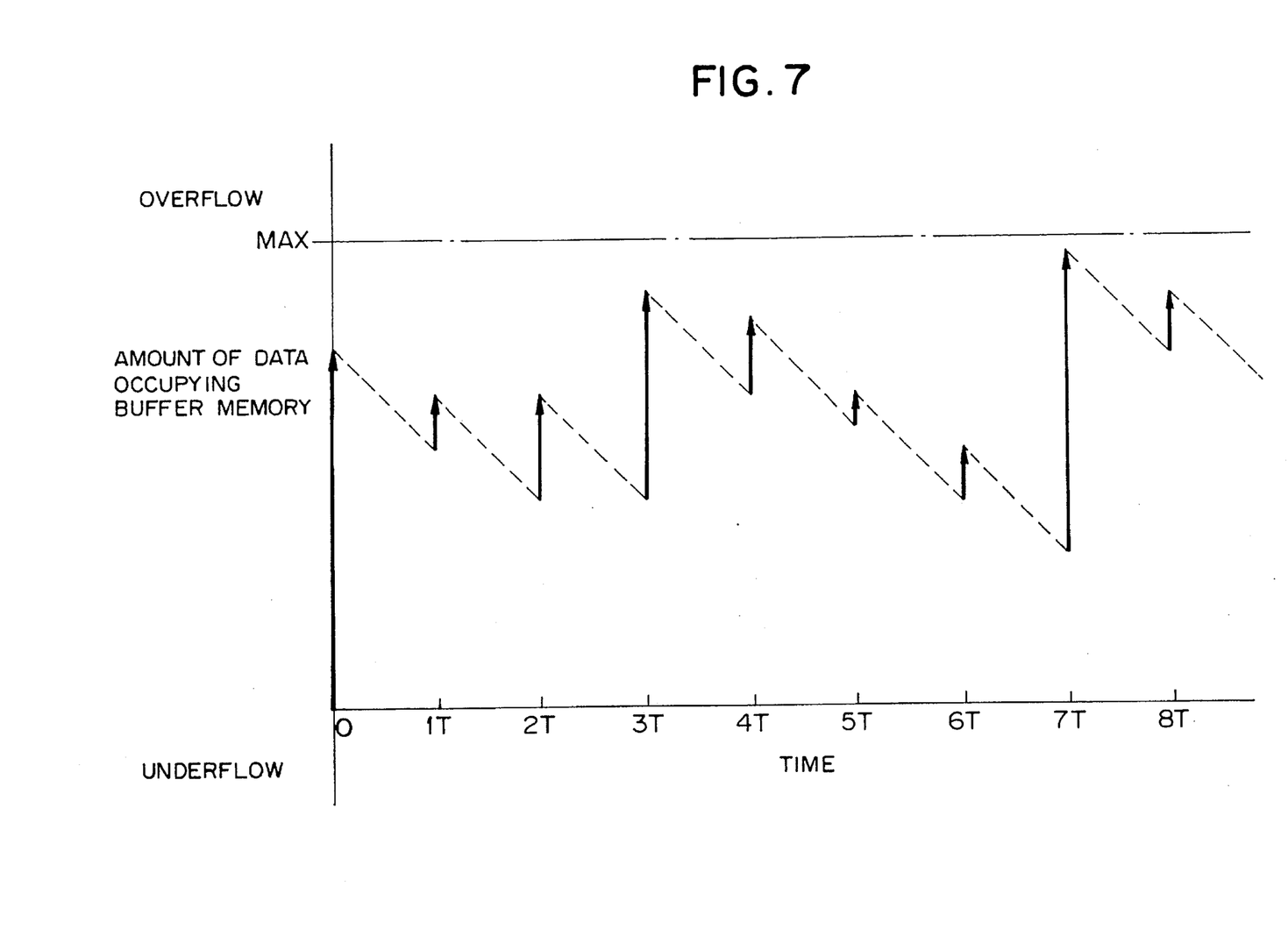
FIG. 7 is a time chart for explaining the operation of a buffer memory of the encoder shown in FIG. 6.

The buffer memory 18 functions as illustrated in FIG. 7. A variable amount of coded data is generated and written in the buffer 18 at times 0, 1T, 2T and so forth (T: frame period). In this diagram, the arrows and their lengths respectively represent the writing directions and the amount of data in the memory 18. The data is read out from the buffer memory 18 at a constant rate. This is represented by the inclined, broken lines in the diagram. The writing and reading are repeated in the illustrated manner. The code amount calculator 23 obtains the amount of data occupying the buffer memory 18, and the quantization controller 24 alters the quantizer scale of the quantizer 15 based on the amount of occupying data in such a way that the buffer memory 18 does not overflow or underflow, thus controlling the amount of data to be input to the buffer memory 18. As the quantizer scale of the quantizer 15 increases, the amount of output data therefrom decreases. As the quantizer scale decreases, on the other hand, the amount of output data from the quantizer 15 increases. The image quality is however reciprocal to the quantizer scale. This control on the amount of codes is also described in the specifications of the ISO 11172 as a method of transferring, at a constant rate, a variable amount of coded data generated frame by frame.

As the amount of data in each GOP is constant in this embodiment, the following control is carried out in addition to the above-described control on the amount of data.

The value of the quantizer scale may be determined as follows.

Under the condition to make the amount of data in one GOP constant, the quantization controller 24 calculates the amount of accumulated data from the head block of the GOP to the immediately before that block (expected amount of accumulated data), based on the amount of data set previously block by block. The quantization controller 24 obtains the difference between this expected amount of accumulated data and the amount of data obtained by the code amount calculator 23 or the amount of accumulated data actually coded and generated from the head block of the GOP to the immediately before that block (actual amount of accumulated data), and determines the value of the quantizer scale so that the actual amount of accumulated data approaches, but does not exceed, the expected amount of accumulated data as close as possible in accordance with the positive or negative sign of that difference and the absolute value thereof. The top of each GOP is indicated by the GOP sync signal GOPsync from the timing generator 26.

The amount of data for each block may be set in the following manner.

(1) The ratio of the amounts of data of I, P and B pictures for each frame is determined.

For example, I:P:B=15:5:1.

(2) The amount of data of each frame determined by the ratio given in the above process (1) is evenly allocated to the individual blocks in one frame.

When coding of all the frames of one GOP is finished, the actual amount of accumulated data is equal to or smaller than the expected amount of accumulated data. To completely match the expected amount of accumulated data with the amount of data in the video data stream in one GOP period, an insufficient amount is compensated by stuffing data (e.g., dummy data consisting of all "0") generated by the stuffing data generator 25.

In the coding system which conforms to the ISO 11172, a bit stream has a plurality of positions where a proper amount of stuffing bits having a predetermined bit pattern can be inserted, and the bit stream is defined so that the presence of stuffing bits and the length thereof can be discriminated. For example, MB STUFF (macroblock stuffing) of a macroblock layer or the like is used. Further, the quantizer scale is also defined to be inserted in the bit stream when it is transmitted. For example, QS (quantizer scale) of a slice layer is used.

The decoder, which decodes a video data stream that includes the stuffing data and quantizer scale and has a constant amount of GOP data, detects various headers inserted in the input bit stream (such as the sequence header, GOP start code, picture start code and slice start code), and is synchronized with this bit stream. The decoder performs decoding of each block in the bit stream by referring to the quantizer scale and performs no decoding on stuffing data when detected, i.e., the stuffing data is not decoded as video or audio signals or other information. In other words, the decoder disregards the stuffing data and can thus perform decoding without particularly executing the above-described data amount control to make the amount of data in each GOP constant.

Although the relation between the pack and the logical blocks is set as a ratio of 1:144 and the relation between the pack and the physical blocks is set as a ratio of 2:9 in the above-described embodiment, the relations are not limited to those ratios. Those relations can be simple and setting them to 1:n and 2:m(n and m being integers) can sufficiently facilitate fast random accessing to a recording medium. Although one GOP consists of 15 frames, the number of frames per GOP can of course take any value.

Although an audio packet and data packets are stored in one pack in this embodiment, video packets alone may be stored as so-called soundless video images.

According to the compressed and coded data recording method of the present invention, as described above in detail, video signals are compressed and coded for every predetermined number of frames with the amount of codes per the predetermined number of frames being constant, the predetermined number of frames of compressed and coded video signals are stored into at least one video packet, the video packet is stored in a pack having a time slot corresponding to the predetermined number of frames (preferably at the end of that pack), and the video signals are recorded on the recording medium in a pack stream containing such packs, with the relation between the size of the pack and the size of the logical block of the recording medium being set to 1:n (n: an integer) and a relation between the size of the pack and the size of the physical block of the recording medium being set to 2:m (m is an integer) Therefore, the correlations between a predetermined number of frames of video signals to be recorded and the sizes of the logical block and physical block of the recording medium are well organized. This invention is therefore an advantageous method of recording compressed and coded data, which is advantageous in improving the speed and ease of random accessing, and reducing the buffer capacity and facilitating control and editing in the reproducing system in the system of recording and reproducing compressed and coded data.

What is claimed is:

1. A compressed and coded data recording method for recording video signals on a recording medium in compressed and coded form, said method comprising the steps of:

compressing and coding video signals for every predetermined number of frames with an amount of codes per said predetermined number of frames being constant;

storing the compressed and coded video signals for each of said predetermined number of frames into at least one video packet;

for each of said predetermined number of frames, storing said at least one video packet in a respective pack having a time slot corresponding to said predetermined number of frames; and recording said video signals on said recording medium in a pack stream containing the respective packs, with a relation between a size of each respective pack, and a size of a logical block of said recording medium being set to 1: n, where n is an integer and with a relation between said size of each respective pack and a size of a physical block of said recording medium being set to 2: m, where m is an integer.

2. The recording method according to claim 1, wherein header information necessary to reproduce said pack stream and header information necessary to reproduce a stream of compressed and coded video signals are inserted in each of the respective packs.

3. The recording method according to claim 1, wherein said at least one video packet and an audio packet retaining said predetermined number of frames or a data packet retaining predetermined information are stored in said respective pack in a time-division multiplexing manner.

4. The recording method according to claim 2, wherein said at least one video packet and an audio packet retaining said predetermined number of frames or a data packet retaining predetermined information are stored in said respective pack in a time-division multiplexing manner.

5. The recording method according to claim 1, wherein said at least one video packet is stored at an end of said respective pack.

6. The recording method according to claim 2, wherein said at least one video packet is stored at an end of said respective pack.

7. The recording method according to claim 3, wherein said at least one video packet is stored at an end of said respective pack.

8. The recording method according to claim 4, wherein said at least one video packet is stored at an end of said respective pack.

* * * * *